United States Patent [19]

Soni et al.

[11] Patent Number: 4,921,648
[45] Date of Patent: May 1, 1990

[54] METHOD OF JOINING AN ARTICLE COMPRISING A CONDUCTIVE POLYMER COMPOSITION TO A POLYMERIC SUBSTRATE

[75] Inventors: Pravin L. Soni, Union City; Nachum Rosenzweig, Palo Alto, both of Calif.

[73] Assignee: Raychem Corporation, Menlo Park, Calif.

[21] Appl. No.: 194,780

[22] Filed: May 17, 1988

Related U.S. Application Data

[60] Division of Ser. No. 720,117, Apr. 2, 1983, Pat. No. 4,775,501, and a continuation-in-part of Ser. No. 596,761, Apr. 4, 1984, abandoned.

[51] Int. Cl.$^5$ .............................................. B29C 61/02
[52] U.S. Cl. .................................... 264/27; 156/49; 156/86; 219/535; 264/36; 264/105; 264/249
[58] Field of Search ...................... 264/27, 230, 342 R

[56] References Cited

U.S. PATENT DOCUMENTS

| | | | |
|---|---|---|---|
| 3,094,452 | 6/1963 | von Riegen et al. | 264/27 |
| 3,658,976 | 5/1972 | Slade | 264/105 |
| 3,953,059 | 4/1976 | Carroll | 264/249 |
| 3,987,276 | 10/1976 | Vogelsanger et al. | 264/27 |
| 4,055,615 | 10/1977 | Ikeda | 164/105 |
| 4,070,044 | 1/1978 | Carrow | 264/249 |
| 4,085,286 | 4/1978 | Horsma | 174/92 |
| 4,151,126 | 4/1979 | Adelman | 252/508 |
| 4,163,117 | 7/1979 | Campbell et al. | 264/249 |
| 4,177,446 | 12/1979 | Dias | 338/212 |
| 4,195,106 | 3/1980 | Brusselmans | 156/84 |
| 4,252,849 | 2/1981 | Nishimura | 428/192 |
| 4,272,474 | 6/1981 | Crocker | 264/176 R |
| 4,314,616 | 12/1981 | Richardson | 264/230 |
| 4,323,607 | 4/1982 | Nishimura et al. | 156/84 |
| 4,362,684 | 12/1982 | Thalmann | 264/230 |
| 4,378,323 | 3/1983 | Brandeau | 264/105 |
| 4,419,156 | 12/1983 | Diaz | 264/230 |
| 4,419,304 | 12/1983 | Ficke | 264/25 |
| 4,421,582 | 12/1983 | Horsma et al. | 264/27 |
| 4,426,339 | 1/1984 | Kamath et al. | 264/27 |
| 4,428,790 | 1/1984 | Diaz | 156/86 |
| 4,436,987 | 3/1984 | Thalmann et al. | 219/535 |
| 4,455,482 | 6/1984 | Grandclement | 264/27 |
| 4,467,002 | 8/1984 | Crofts | 264/230 |
| 4,518,552 | 5/1985 | Matsuo | 264/126 |
| 4,521,470 | 6/1985 | Overbergh et al. | 156/84 |
| 4,586,970 | 5/1986 | Ishise et al. | 156/86 |
| 4,596,732 | 6/1986 | Diaz | 428/181 |
| 4,626,458 | 12/1986 | Pithouse et al. | 156/86 |
| 4,650,228 | 3/1987 | McMills et al. | 156/86 |
| 4,686,071 | 8/1987 | Rosenzweig et al. | 264/27 |
| 4,775,501 | 10/1988 | Rosenweig et al. | 264/27 |

FOREIGN PATENT DOCUMENTS

| | | |
|---|---|---|
| 705309 | 3/1965 | Canada . |
| 36963 | 5/1981 | European Pat. Off. . |
| 42262 | 6/1981 | European Pat. Off. . |
| 0052476 | 5/1982 | European Pat. Off. ............ 156/86 |
| 2414077 | 10/1975 | Fed. Rep. of Germany . |
| 2832119 | 2/1979 | Fed. Rep. of Germany . |
| 3107489A | 9/1982 | Fed. Rep. of Germany . |
| 56-95647 | 8/1981 | Japan . |
| 57-56226 | 4/1982 | Japan . |
| 58-81129 | 5/1983 | Japan . |
| 1440539 | 9/1965 | United Kingdom . |
| 1116878 | 6/1968 | United Kingdom . |
| 1265194 | 3/1972 | United Kingdom . |
| 2012149 | 7/1979 | United Kingdom . |
| 2076049 | 12/1981 | United Kingdom . |

Primary Examiner—Jeffery Thurlow
Attorney, Agent, or Firm—Timothy H. P. Richardson; Marguerite E. Gerstner; Herbert G. Burkard

[57] ABSTRACT

A method of joining a substrate, particularly a polymeric pipe for transporting fluids, e.g. natural gas and water, to an article which is not heat-recoverable and which comprises a conductive polymer composition. The article is heated by passing electrical current through the conductive polymer. The heated article makes direct contact with and fuses to the substrate, and is preferably a coupler which is used to join two pipes together. The conductive polymer preferably comprises carbon black dispersed in a sintered polymer, particularly ultra high molecular weight polyethylene, or carbon black dispersed in a very high molecular weight polymer, particularly polyethylene having a molecular weight greater than 150,000.

29 Claims, 1 Drawing Sheet

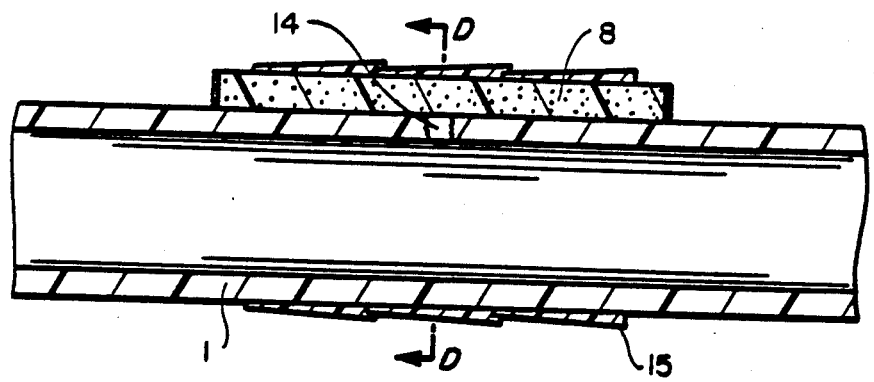
FIG_1
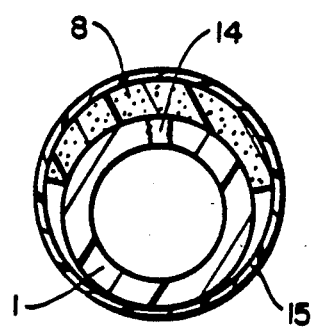
FIG_2

METHOD OF JOINING AN ARTICLE COMPRISING A CONDUCTIVE POLYMER COMPOSITION TO A POLYMERIC SUBSTRATE

BACKGROUND OF THE INVENTION

This application is a divisional of application Ser. No. 720,117, filed 4/2/85, now U.S. Pat. No. 4,775,501, which is itself a continuation-in-part of application Ser. No. 596,761, filed Apr. 4, 1984, now abandoned. The disclosure of each of these documents is incorporated herein by reference.

Field of the Invention

This invention relates to articles comprising conductive polymer compositions, and their use for joining, repairing, reinforcing or otherwise modifying substrates, particularly pipes, composed of an organic polymer.

Introduction to the Invention

Many methods are known for joining, repairing and reinforcing pipes and other substrates, including methods which make use of heat-recoverable articles comprising conductive polymers, which, when powered, supply the heat needed to cause recovery of the article. Reference may be made for example to U.S. Pat. Nos. 4,085,286, 4,177,446, and 4,421,582, and U.K. Patent No. 1,265,194, the disclosures of which are incorporated herein by reference. However, all the known methods suffer from one or more disadvantages, especially for joining pipes composed of organic polymers (often referred to as "plastic pipes"). This invention includes a new and advantageous method for joining plastic pipes and other substrates having at least an exterior surface composed of a polymeric composition.

SUMMARY OF THE INVENTION

In its first aspect, the invention provides a method of joining together
(A) a substrate having an outer surface composed of a first composition which is a heat-softenable composition comprising an organic polymer, and
(B) an article which is not heat-recoverable and which comprises an element composed of a second composition which
  (a) is compatible with the first composition,
  (b) has a Melt Flow Index of less than 0.3 g/10 min. at a temperature 50° C. above its softening point and at a loading of 5 kg, and has a Melt Flow Index of less than 3.0 g/10 min. at a temperature 50° C. above its softening point and at a loading of 15 kg; and
  (c) comprises
    (a) a matrix consisting essentially of organic polymer particles which have been sintered together so that the particles have coalesced without losing their identity, and
    (b) a particulate conductive filler which is dispersed in said matrix but is present substantially only at or near the boundaries of the coalesced particles;
which method comprises
(1) placing the article in direct contact with the outer surface of the substrate; and
(2) generating heat within the conductive polymer element by passing electrical current therethrough while maintaining the article in direct contact with the substrate, until there is fusion between the article and the outer surface of the substrate.

In its second aspect, the invention provides a method of joining together
(A) a substrate having an outer surface composed of a first composition which is a heat-softenable composition comprising an organic polymer, and
(B) an article which is not heat-recoverable and which comprises a melt-shaped element composed of a second composition which
  (a) is compatible with the first composition;
  (b) has a Melt Flow Index of less than 0.3 g/10 min. at a temperature 50° C. above its softening point and at a loading of 5 kg, and has a Melt Flow Index of less than 3.0 g/10 min. at a temperature 50° C. above its softening point and at a loading of 15 kg; and
  (c) comprises
    (i) an organic polymer having a molecular weight of at least 150,000, and
    (ii) dispersed in the polymer, a particulate conductive filler;
which method comprises
(1) placing the article in direct contact with the outer surface of the substrate; and
(2) generating heat within the conductive polymer element by passing electrical current therethrough while maintaining the article in direct contact with the substrate, until there is fusion between the article and the outer surface of the substrate.

The term "fusion", which is said to occur between the article and the outer surface of a substrate, is used herein to mean that sufficient molecular compatibility exists between the first and second compositions that a bond forms which will provide mechanical performance equal to or greater than that of the substrate. This may be through viscoelastic contact as defined by J. N. Anand in Adhesion 1, 1969, pages 16 through 23 and Adhesion 2, 1970, pages 16 through 22, or through a process of molecular diffusion across the polymer/polymer interface, such that, within the interfacial region there is a continous concentration gradient of one polymer in the other.

In the first aspect of the invention, the article comprises an element composed of a sintered conductive polymer composition comprising a matrix consisting essentially of organic polymer particles which have been sintered together so that the particles have coalesced without losing their identity. Preferably the sintered conductive polymer composition comprises ultra high molecular weight polyethylene having a molecular weight of at least 3 million. In the second aspect of the invention, the article comprises a melt-shaped element composed of a high molecular weight polymer, particularly polyethylene, having a molecular weight of at least 150,000, preferably in the range 150,000 to 600,000, more preferably in the range 200,000 to 400,000.

BRIEF DESCRIPTION OF THE DRAWING

The invention is illustrated in the accompanying drawings, in which the Figures are diagrammatic cross-sectional illustrations of the method of the invention. In particular:

FIG. 1 shows an assembly for patching a hole in a pipe;

FIG. 2 shows the patched pipe prepared by the method of FIG. 1.

DETAILED DESCRIPTION OF THE INVENTION

The methods of the invention can be used to join, repair, reinforce or otherwise modify any type of substrate having an outer surface composed of a heat-softenable composition comprising an organic polymer, including pipes and cables, e.g. power cables, telecommunication cables and cables containing optical fibers. The term "organic polymer" is used herein to denote any polymer which contains carbon in the backbone and/or in the side chains, including for example polymers of olefinic monomers, polyamides, polyesters, polyacrylates, polyimides, polycarbonates and polysiloxanes. It is preferred to continue the heating of the article, after the surface of the substrate has softened, so that at least one of the first and second compositions can wet the other and thus cause fusion (as hereinbefore defined) of the compositions at the interface; for example, when using the preferred sintered conductive polymer compositions, there can be wetting and flow of a less viscous substrate composition around and possibly into the sintered article. To achieve such fusion, at least one and preferably both of the compositions should be above its softening point (in the case of crystalline polymers, above its crystalline melting point). The compatibility of different polymeric compositions depends upon a variety of factors, including both the chemical natures of the polymers and the other ingredients, e.g. fillers, of the compositions. However, those skilled in the art will have no difficulty, having regard to their own knowledge and the disclosure herein, in determining whether any two particular compositions are compatible. In many (but by no means all) cases, compatibility is the result of substantial amounts of common recurring units in the polymers of the two compositions, as for example when at least 10%, preferably at least 30%, of the recurring units in the polymeric component of the first composition are the same as at least 10%, preferably at least 30%, of the recurring units in the polymeric component of the second composition, these percentages being based on the number of recurring units.

The article may be any suitable shape depending on the nature of the substrates. In one embodiment the article is generally tubular, preferably cylindrical. Preferably the wall thickness of the article, whatever its shape, is at least 0.07 inch. The tubular article may be formed by a variety of methods, for example by moulding, extruding or sintering it directly into that shape, or by wrapping a number of overlapping layers of tape helically around a mandrel until the desired thickness of article is achieved, and then removing the mandrel. The wrapped tape may be heated before removal of the mandrel to fuse the layers of the tape together. The tape is preferable formed by extrusion.

When the substrate (or substrates) comprises a heat-softenable polymeric composition whose functional properties can be adversely affected by excessive heating, care must be taken to limit the heat generated within the conductive polymer to an amount that does not have an adverse effect. Thus in the case of a pipe composed of heat-softenable polymeric material, heating should be discontinued before the pipe becomes distorted (as a result of pressure from the coupler or as a result of shrinkage of an oriented pipe) to an extent which has a substantial adverse effect; preferably the interior surface of the pipe remains substantially unchanged.

In one very useful embodiment of the invention, the article is a coupler and is used to join two or more pipes. The pipes can be the same or different in size and can be the same or different in composition. The ends of the pipes can be joined, or one or more pipes can be connected as branches to another pipe, usually of larger diameter.

In one embodiment of the present invention, particularly when joining substrates, for example pipes, together, a hollow internal support member is used. The support member, for example, can function solely to maintain substantially the original internal dimensions of the pipes (e.g. when joining thin-walled plastic pipes which would otherwise be distorted by the coupler). Alternatively, the support member can increase the strength of the coupling by modifying the shape of the pipes, e.g. through the presence of circumferential ribs or other protruberances on the external surface of the support member or through use of a support member whose center section is of smaller size than its end sections. The support member can also provide an adhesive at the junctions of the pipes and/or bond chemically to one or both of the pipes. The support member can also provide a stop against which the end(s) of the pipe(s) can be butted, or can help to align the pipes (or otherwise maintain them in a desired spatial relationship). The support member is preferably shorter than the coupler, so that if the joint is subsequently flexed, the bending forces are not concentrated at the ends of the support member. The support member can be secured to the article so as to provide one or more pockets into which the substrate(s) can be inserted.

The invention is particularly useful for joining two or more pipes, with at least one of the pipes being composed of a composition based on an organic polymer, in particular polyethylene, polypropylene, or polyvinyl chloride, for example polyethylene pipes used to distribute natural gas or water, e.g. irrigation pipes.

The articles used in the present invention comprise, and may consist essentially of, an element composed of a conductive polymer composition as defined. Heat is generated within the conductive polymer composition by passing electrical current through the element. Conductive polymer compositions are well known and comprise an organic polymer component and, dispersed in the organic polymer component, a particulate conductive filler. The preferred particulate filler in the present invention is carbon black. The conductive polymers used in the present invention preferably have resistivities at 23° C. in the range of 0.5 to 100 ohm.cm, with particularly preferred values within this range being dependent on the composition of the conductive polymer, the dimensions of the article, the electrode placement and the power source. Where sintered conductive polymers are used the composition preferably have resistivities in the range 1.5 to 100 ohm.cm. Preferably these factors are selected so that a satisfactory result, in particular fusion at the interface, is obtained in a relatively short time, e.g. within 10 minutes, preferably within 5 minutes. Suitable power sources include for example DC voltages of 6, 12, 24 or 48 volts, for which resistivities of 0.5 to 10 ohm.cm are usually preferred, as well as voltages of 36–40, 110–120 or 220–240 volts AC, for which higher resistivities, e.g 50–100 ohm.cm, are appropriate. The preferred dimensions of the articles will of course depend on their intended use. For tubular articles, the ratio of the diameter of the article to the wall thickness is preferably less than 18:1, e.g. 2:1 to 12:1. A relatively large wall thickness of at least 0.07 inch, preferably at least 0.1 inch, is often desirable in order to ensure adequate strength to resist mechanical stresses and internal pressures.

Many conductive polymer compositions are known, and most of them are prepared by a melt-mixing process. The filler loadings needed to produce the desired levels of resistivity in melt-mixed conductive polymer compositions typically result in relatively poor physical properties. We have surprisingly found that when melt-processed high molecular weight polyethylene is used, having a molecular weight in the range 150,000 to 600,000, the change in the physical properties that occur as the filler loading is increased is less than that which occurs for lower molecular weight polyethylene. Conductive polymers with such high molecular weight polyethylene can be prepared by dry blending or melt blending the polymer particles and the conductive filler. The quantity of conductive filler required to provide a given level of resistivity is more than for the ultrahigh molecular weight polyethylene. The high molecular weight polyethylene composition preferably contains less than 26 weight percent, preferably less than 24 weight percent, especially preferably 18–24 weight percent of carbon black or other conductive filler.

In the first aspect of the invention, a sintered conductive polymer composition is used rather than a melt-processed polymer. The sintered composition comprises and preferably consists essentially of, (a) a matrix consisting essentially of organic polymer particles which have been sintered together so that the particles have coalesced without completely losing their identity, and (b) a particulate filler, preferably carbon black which is dispersed in said matrix but which is present substantially only at or near the boundaries of the coalesced particles.

Such conductive polymers can be prepared by sintering a dry blend of the polymer particles and the conductive filler. A typical process involves compaction of the dry blend, sintering of the compacted blend at or above atmospheric pressure and at a temperature at which the polymer softens but does not flow excessively, followed by cooling under pressure. The quantity of conductive filler required to provide a given level of resistivity is much less than in a melt-blended product. Thus the preferred sintered compositions for use in this invention contain less than 9%, preferably less than 7%, particularly 2 to 6%, by volume of carbon black or other conductive filler. Care must be used in selecting the carbon black (or other filler) in order to achieve the desired level of resistivity at these loadings. We have obtained excellent results using Ketjenblack EC, available from Akzo Chemie.

The polymer used in the second composition (whether melt-formed or sintered) is one which maintains a relatively high viscosity at the melt-forming or sintering temperature. Accordingly the polymer has, at a temperature 50° C. above its softening point, a Melt Flow Index of less than 0.3 g/10 min, particularly less than 0.1 g/10 min, especially less than 0.05 g/10 min, at a loading of 5 kg, and a Melt Flow Index of less than 3.0 g/10 min, particularly less than 1.0 g/10 min, especially less than 0.1 g/10 min, at a loading of 15 kg. Similarly, the composition in the article preferably has a high load melt index (HLMI), measured by ASTM D1238, Condition F 190/21.6, of less than 30, particularly less than 25, especially less than 20. Particularly good results have been obtained using ultra high molecular weight polyethylene (UHMWPE), especially such polyethylene having a molecular weight greater than about 1.5 million, particularly greater than about 3.0 million. In this connection, reference may be made to copending, commonly assigned application Ser. No. 582,105 filed Feb. 21, 1984 (MP0907-US1) by Rosenzweig, the disclosure of which is incorporated herein by reference. Another polymer which behaves similarly when sintered is polytetrafluoroethylene (PTFE). Other polymers which can be sintered, but which are less viscous under sintering conditions than is preferred, are polyphenylene sulfide (PPS) and polyimides.

Particularly good results have also been obtained using melt-processed high molecular weight polymers in particular high molecular weight polyethyene (HMWPE) especially such polyethylene having a molecular weight greater than about 150,000 particularly greater than about 200,000. In this connection, reference may be made to copending commonly assigned application Ser. No. 720,118, the disclosure of which is incorporated herein by reference.

Any appropriate electroding means can be used to ensure satisfactory current flow through the conductive polymer. Thus electrodes can be incorporated into the conductive polymer during its shaping or can be applied to the exterior surface of the shaped element. By appropriate electroding arrangements, current can be caused to flow from end to end of the article or through the thickness thereof.

The invention is illustrated in the accompanying drawing.

FIG. 1 shows the repair of a plastic pipe 1 using a patch 8 which is not heat-recoverable and which is composed of a sintered conductive polymer composition which is compatible with the pipe material. Plastic pipe 1 has a hole 14 therein which needs to be repaired. The patch is placed over the hole and is kept in place by means of tape 15 which is wrapped around the patch and the tape. Current is passed through the patch so that it softens and fuses to the pipe, resulting in the product shown in FIG. 2, which is a cross-section on line D—D of FIG. 1.

We claim:

1. A method of joining together (A) a substrate having an outer surface composed of a first composition which is a heat-softenable composition comprising an organic polymer, and (B) an article which is not heat-recoverable and which comprises an element composed of a second composition which (a) is compatible with the first composition, (b) has a Melt Flow Index of less than 0.3 g/10 min. at a temperature 50° C. above its softening point and at a loading of 5 kg and has a Melt Flow Index of less than 3.0 g/10 min. at a temperature 50° C. above its softening point and at a loading of 15 kg; and (c) comprises (a) a matrix consisting essentially of organic polymer particles which have been sintered together so that the particles have coalesced without losing their identity, and (b) a particulate conductive filler which is dispersed in said matrix but is present substantially only at or near the boundaries of the coalesced particles;

which method comprises
(1) placing the article in direct contact with the outer surface of the substrate; and
(2) generating heat within the conductive polymer element by passing electrical current therethrough while maintaining the article in direct contact with the substrate, until there is fusion between the article and the outer surface of the substrate.

2. A method according to claim 1 wherein the organic polymer in the second composition is ultrahigh molecular weight polyethylene.

3. A method according to claim 1 wherein the conductive filler comprises carbon black.

4. A method according to claim 2 wherein the conductive filler is carbon black and is present in amount 2 to 6% by volume of the composition.

5. A method according to claim 1 wherein there are two substrates, each in the form of a pipe composed of the first composition and a coupler comprising said article is used to join the pipes together.

6. A method according to claim 5 wherein the pipes are of different sizes.

7. A method according to claim 1 wherein the article is held in direct contact with the substrate by means of at least one securing member.

8. A method according to claim 1 wherein the substrate is in the form of a pipe which is composed of the first composition and which has a hole in the wall thereof, and a patch comprising the article is placed in direct contact with the wall of the pipe around the hole.

9. A method according to claim 1 wherein the first composition comprises polyethylene and the second composition comprises sintered ultra high molecular weight polyethylene.

10. A method according to claim 1 wherein the organic polymer in the second composition is an ultrahigh molecular weight polyethylene having a molecular weight greater than 1.5 million.

11. A method according to claim 1 wherein the second composition has a resistivity at 23° C. of 1 to 100 ohm.cm and contains less than 9% by volume of a particulate conductive filler.

12. A method according to claim 1 wherein the second composition has a high load melt index, measured by ASTM D1238 Condition F 190/21.6, of less than 25.

13. A method according to claim 1 wherein the second composition
(a) has a resistivity at 23° .C of 1 to 100 ohm.cm, and
(b) comprises
(i) a matrix consisting essentially of particles of ultra high molecular weight polyethylene which have been sintered together so that the particles have coalesced without losing their identity, and
(ii) less than 9% by volume of a particulate conductive filler which is dispersed in said matrix but is present substantially only at or near the boundaries of the coalesced particles of polyethylene.

14. A method according to claim 13 wherein the polyethylene has a molecular weight greater than 4.0 million.

15. A method according to claim 5 which comprises placing a hollow support member within at least one of the pipes.

16. A method according to claim 1 wherein said article consists essentially of the conductive polymer element and electrodes secured thereto.

17. A method according to claim 1 wherein the first composition comprises a polymeric component in which at least 30% of the recurring units are the same as at least 30% of the recurring units in the polymeric component of the second composition.

18. A method of joining together
(A) a substrate having an outer surface composed of a first composition which is a heat-softenable composition comprising an organic polymer, and
(B) an article which is not heat-recoverable and which comprises a melt-shaped element composed of a second composition which
(a) is compatible with the first composition;
(b) has a Melt Flow Index of less than 0.3 g/10 min. at a temperature 50° C. above its softening point and at a loading of 5 kg and has a Melt Flow Index of less than 3.0 g/10 min. at a temperature 50° C. above its softening point and at a loading of 15 kg; and
(c) comprises
(i) an organic polymer having a molecular weight of at least 150,000, and
(ii) dispersed in the polymer, a particulate conductive filler which method comprises
(1) placing the article in direct contact with the outer surface of the substrate; and
(2) generating heat within the conductive polymer element by passing electrical current therethrough while maintaining the article in direct contact with the substrate, until there is fusion between the article and the outer surface of the substrate.

19. A method according to claim 18 wherein there are two substrates, each in the form of a pipe composed of the first composition, and a coupler comprising said article is used to join the pipes together.

20. A method according to claim 18 wherein the substrate is in the form of a pipe which is composed of the first composition and which has a hole in the wall thereof, and a patch comprising the article is placed in direct contact with the wall of the pipe around the hole.

21. A method according to claim 18 wherein the first composition comprises polyethylene and the second composition comprises polyethylene having a molecular weight of 150,000 to 600,000.

22. A method according to claim 19 which comprises placing a hollow support member within at least one of the pipes.

23. A method according to claim 18 wherein the second composition has a resistivity at 23° C. of 1 to 100 ohm.cm and contains less than 26% by weight of a particulate conductive filler.

24. A method according to claim 18 wherein the second composition has a high load melt index, measured by ASTM D1238 Condition F 190/21.6, of less than 25.

25. A method according to claim 24 wherein the second composition has a high load melt index of less than 20.

26. A method according to claim 18 wherein the second composition has been cross-linked.

27. A method according to claim 18 wherein the organic polymer in the second composition is polyethylene having a molecular weight of at least 200,000.

28. A method according to claim 18 wherein said article consists essentially of the conductive polymer element and electrodes secured thereto.

29. A method according to claim 18 wherein the first composition comprises a polymeric component in which at least 30% of the recurring units are the same as at least 30% of the recurring units in the polymeric component of the second composition.

* * * * *